US009860282B2

(12) United States Patent
Farrell

(10) Patent No.: US 9,860,282 B2
(45) Date of Patent: Jan. 2, 2018

(54) REAL-TIME SYNCHRONOUS COMMUNICATION WITH PERSONS APPEARING IN IMAGE AND VIDEO FILES

(71) Applicant: International Business Machines Corporation, Armonk, NY (US)

(72) Inventor: Robert G. Farrell, Cornwall, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/377,275

(22) Filed: Dec. 13, 2016

(65) Prior Publication Data
US 2017/0104793 A1 Apr. 13, 2017

Related U.S. Application Data

(62) Division of application No. 14/881,885, filed on Oct. 13, 2015.

(51) Int. Cl.
*H04N 7/14* (2006.01)
*H04L 29/06* (2006.01)
(Continued)

(52) U.S. Cl.
CPC ...... *H04L 65/1069* (2013.01); *G06F 3/04842* (2013.01); *G06F 17/3082* (2013.01); *G06F 17/30268* (2013.01); *G06K 9/00255* (2013.01); *G06K 9/00268* (2013.01); *G10L 17/005* (2013.01); *G10L 17/02* (2013.01);
(Continued)

(58) Field of Classification Search
CPC combination set(s) only.
See application file for complete search history.

(56) References Cited

U.S. PATENT DOCUMENTS 8,861,804 B1 10/2014 Johnson et al.
2006/0166646 A1 7/2006 Roach, Jr.
(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.
(Continued)

*Primary Examiner* — Joseph J Nguyen
*Assistant Examiner* — Phung-Hoang J. Nguyen
(74) *Attorney, Agent, or Firm* — Yeen Tham; Ryan, Mason & Lewis, LLP

(57) ABSTRACT

Systems and methods are provided for enabling real-time synchronous communication with persons appearing in image or video files. For example, an image or video file is displayed on a display screen of a computing device. The computing device detects a user selection of a person present in the displayed image or video. A request is sent from the computing device to a service provider for profile information associated with the user-selected person. The computing device receives from the service provider profile information associated with the user-selected person, wherein the profile information includes a communications address of the user-selected person. The communications address is utilized to initiate a communications session on the computing device with the user-selected person present in the displayed image or video.

20 Claims, 8 Drawing Sheets

(51) Int. Cl.
    *G06F 3/0484*     (2013.01)
    *G10L 17/00*     (2013.01)
    *G10L 17/02*     (2013.01)
    *G06F 17/30*     (2006.01)
    *G06K 9/00*     (2006.01)
    *H04L 29/08*     (2006.01)
    *H04N 7/15*     (2006.01)

(52) U.S. Cl.
    CPC ............ H04L 65/403 (2013.01); H04L 67/10 (2013.01); H04L 67/306 (2013.01); H04N 7/141 (2013.01); H04N 7/147 (2013.01); H04N 7/15 (2013.01)

(56) References Cited

U.S. PATENT DOCUMENTS

| | | |
|---|---|---|
| 2009/0300010 A1 | 12/2009 | Ratnakar |
| 2010/0246576 A1 | 9/2010 | Bustamente |
| 2011/0026778 A1* | 2/2011 | Ye .................... G06F 17/30247 382/118 |
| 2012/0242840 A1 | 9/2012 | Nakfour et al. |
| 2012/0311722 A1 | 12/2012 | Wang et al. |
| 2013/0034262 A1 | 2/2013 | Surty et al. |
| 2013/0156275 A1 | 6/2013 | Amacker et al. |
| 2014/0328521 A1 | 11/2014 | Colangelo |
| 2015/0046375 A1 | 2/2015 | Mandel et al. |
| 2016/0092962 A1 | 3/2016 | Wasserman et al. |
| 2016/0125383 A1 | 5/2016 | Chan et al. |
| 2016/0183072 A1* | 6/2016 | Mitty .................... H04W 4/22 455/404.1 |

OTHER PUBLICATIONS

List of IBM Patents or Patent Applications Treated as Related.

* cited by examiner

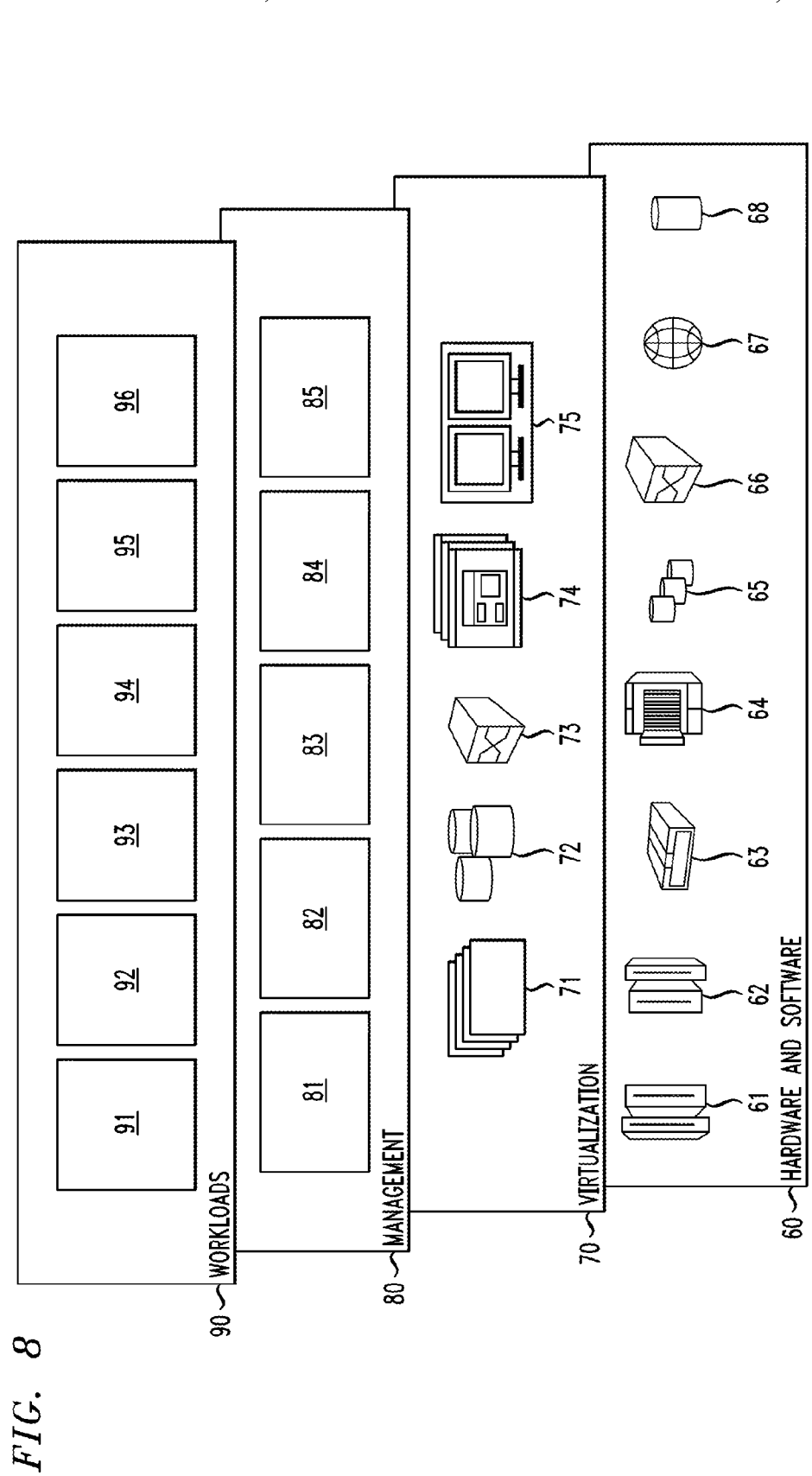

REAL-TIME SYNCHRONOUS COMMUNICATION WITH PERSONS APPEARING IN IMAGE AND VIDEO FILES

TECHNICAL FIELD

This disclosure generally relates to social networking and, in particular, systems and methods to facilitate communication between persons in social networks.

BACKGROUND

Currently, there are various on-line social networks and other web sites such as Facebook, Image Shack, Photo-Bucket, and Flickr, for example, which store billions of images and videos that are uploaded by individuals who utilize such web sites to communicate and share content and information with other individuals. These web sites further include a vast amount of information regarding registered users including, for example, profile pictures, addresses, and contact information (e-mail addresses, phone numbers, etc.) of the registered users. When a person watches a video or views a picture that is sent from another person or discovered on-line, the person may want to immediately contact or communicate with one or more individuals present in the video or picture. However, if the contact information of such individuals is not offered in the video or pictures, or if the contact information of such individuals is not known or otherwise accessible to the person viewing the video or picture (e.g., not included in address book of person), the person will not be able to immediately contact such individuals. Instead, the person would have to spend time to find and verify the contact information of a given individual. This can be burdensome, especially if such contact information cannot be found or is otherwise not readily accessible.

SUMMARY

Embodiments of the invention include systems and methods for enabling real-time synchronous communication with persons appearing in image or video files.

One embodiment includes a method that is implemented by a computing device. An image or video is displayed on a display screen of the computing device. The computing device detects a user selection of a person present in the displayed image or video. A request is sent from the computing device to a service provider for profile information associated with the user-selected person. The computing device receives from the service provider profile information associated with the user-selected person, wherein the profile information includes a communications address of the user-selected person. The communications address is utilized to initiate a communications session on the computing device with the user-selected person present in the displayed image or video. In one embodiment of the invention, the computing device displays the profile information on the display screen of the computing device along with a control button. The control button is configured to automatically initiate the communications session with the user-selected person using the communications address, in response to user-selection of the displayed control button.

Another embodiment includes a method implemented by a service provider. The service provider receives a request from a computing device for profile information associated with a person. The received request includes image data which includes a face of the person whose profile information is being requested. The service provider performs a verification process to verify an identity of the person, wherein verifying includes performing a face recognition process using the image data to identify the person. If the identity of the person is verified, the service provider proceeds to obtain profile information associated with the person, wherein the profile information comprises a communications address of the person, and then provides the profile information to the computing device.

Other embodiments of the invention will be described in the following detailed description of embodiments, which is to be read in conjunction with the accompanying drawings.

DESCRIPTION OF THE DRAWINGS

FIG. 8 depicts abstraction model layers according to an embodiment of the invention.

DETAILED DESCRIPTION

Figure 1:
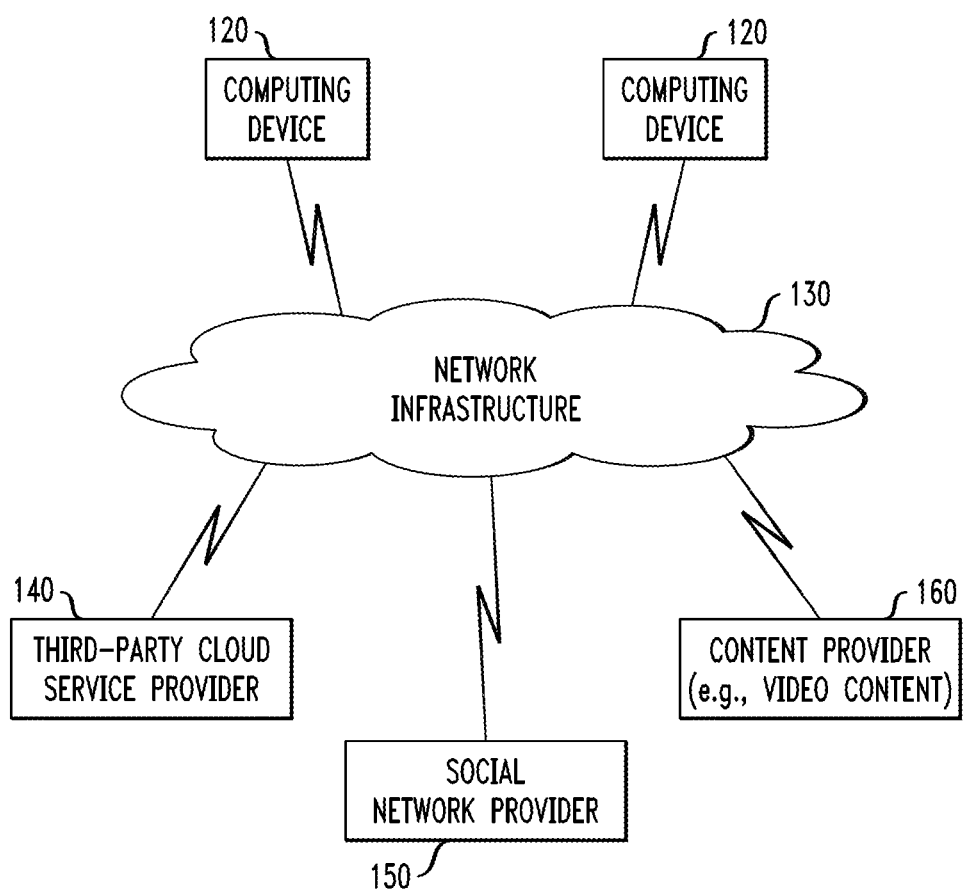
FIG. 1 illustrates a system to provide real-time synchronous communication with persons appearing in image or video files, according to an embodiment of the invention.

Embodiments of the invention will now be described in further detail with regard to systems and methods for enabling real-time synchronous communication with persons appearing in image or video files. For example, FIG. 1 illustrates a system 100 for enabling real-time synchronous communication with persons appearing in image or video files, according to an embodiment of the invention. The system 100 comprises a plurality of computing devices 120, a computing network 130, a third-party cloud service provider 140, one or more social network providers 150 (e.g., Facebook), and one or more content providers 160 (e.g., video content on YouTube). The computing devices 120 are configured to communicate with the third-party cloud service provider 140, the social network provider(s) 150, and the content provider(s) 160 over the network 130. By way of example, the computing devices 120 include smart phones, portable laptop computers, electronic tablets, and other types of computing devices that are capable of rendering and displaying video and image files, and allowing persons to communicate via telephone calls, video chatting, etc.

The network 130 may comprise, for example, a global computer network such as the Internet, a wide area network (WAN), a local area network (LAN), a satellite network, a telephone or cable network, a cellular network, a wireless network such as Wi-Fi, or various portions or combinations of these and other types of networks. The term "network" as used herein is therefore intended to be broadly construed, so as to encompass a wide variety of different networks, including combinations of multiple networks of different types.

In general, the system 100 allows a user viewing an image or video on the user's computing device 120 to synchronously communicate with one or more persons present in the image or video. The image or video may be a file that is downloaded from, or otherwise being streamed from the social network provider 150, or the content provider 160, or an image file or video file that is locally stored in the user's computing device 120. When viewing an image or video on the display screen of the computing device 120, the user may recognize a person in the image or video with whom the user wants to communicate with, or the user may not recognize a person in the image or video but nonetheless wants to communicate with that person based on, e.g., the person's appearance, the object(s) that are in proximity to the person, the activity in which the person is engaged, etc. For example, the user may see (in a video) a real estate agent who is selling a house that the user has an interest in buying, but the user may not know the real estate agent but wants to contact the real estate agent to obtain information about the house.

While viewing the image or video file, the user can select a person of interest by, e.g., tapping on the person's body or face as displayed in the image or video frame on the screen of the user's computing device 120. For example, when a user is viewing a video file and sees a person of interest appearing in the video, the user can gesture (e.g., tap and hold) near the face of the person of interest. The video is then paused, and then a sequence of operations are performed to extract one or more video frames, and process the extracted video frame using known face detection/recognition techniques to detect image data associated with the person's face and perform facial recognition on the detected face to verify an identity of the person of interest. Depending on the implementation and the processing capabilities of the computing device, the face detection and/or recognition functions can be performed on-line or off-line.

For example, in one embodiment, the computing device 120 is configured to send a request to the third-party cloud service provider 140 for profile information associated with the person of interest selected by the user. In one embodiment of the invention, when the user is viewing a video file, the request includes data comprising a sequence of one or more images within video frames that are near the time of the user selection (e.g., tapping on screen) and the location in the image corresponding to where the user tapped the display screen. When the user is viewing an image file, the request includes either the entire image file, or a portion of the image file near the location of the user selection (e.g., tapping on screen), as well as the location in the image corresponding to where the user tapped the display screen.

The third-party cloud service provider 140 receives the request transmitted from the user's computing device 120 for profile information associated with person of interest. The third-party cloud service provider 140 is configured to perform a face detection process to identify a face in the one or more of the images received with the request. For example, when the user selects a person of interest shown in a video, the face detection process processes video frame images closest in time to the time of the user tapping of the display screen, and closest in proximity to the location of the user tapping within the video frame images, to detect a face of the person of interest selected by the user.

Furthermore, in one embodiment of the invention, the third-party cloud service provider 140 is configured to use the image data of the detected face of the person of interest appearing in the video or image to verify an identity of the person of interest. In one embodiment, the verification process comprises performing a face recognition process using the image data of the detected face to identify the person of interest. For example, in one embodiment of the invention, the third-party cloud service provider 140 implements a face recognition system based on Convolutional Neutral Networks (CNNs) to identify the person of interest from a large online database a profile pictures of registered users.

If the identity of the person of interest is verified, the third-party cloud service provider 140 will attempt to obtain profile information associated with that person, wherein the profile information comprises a communications address of the person, optional identifying information (e.g., name of the person), and other supplementary information (e.g., alternative contact addresses, bio, etc.). If the profile information for the person of interest is found (e.g., the profile information is registered with the third-party cloud service provider 140), the third-party cloud service provider 140 will determine if there are any privacy policies associated with the person of interest, which would prevent, limit, otherwise specify the manner in which profile information of the person of interest can be disseminated. The third-party cloud service provider 140 will transmit profile information of the person of interest to the user's computing device 120 in accordance with the associated privacy policies, if any.

The computing device 120 is configured to receive and process the profile information, and then display the profile information on the display screen of the computing device 120 in proximity to the user-selected person of interest appearing in the displayed image or video. In addition, the computing device 120 is configured to generate and display one or more control buttons along with the profile information, wherein the one or more control buttons include at least one user-selectable control button that is configured to automatically establish a synchronous communications session with the person of interest appearing in the image or video using the communications address, in response to user-selection of the displayed control button.

The computing devices 120 and the third-party cloud service provider 140 implement various functions to support real-time synchronous communication with persons appearing in image or video files. An embodiment of computing device 120 will be discussed in further detail below with reference to FIG. 2, and an embodiment of the third-party cloud service provider 140 will be discussed in further detail below with reference to FIG. 3.

In one embodiment of the invention, the third-party cloud service provider 140 operates independent from the social network providers 150 and the content providers 160, wherein the third-party cloud service provider 140 comprises a large databases of user information comprising profile pictures and information (e.g., names, communications addresses, etc.) of a population of users that are registered with the third-party cloud service provider 140.

In another embodiment, the service provider 140 can operate on behalf of one or more of the social network providers 150 and the content providers 160, to provide support services for real-time synchronous communication with persons appearing in image or video files, while utilizing the large databases of user information (profile pictures and contact information) collected and maintained by registered users of the social network providers 150 and the content providers 160.

In yet another embodiment of the invention, the various functions implemented by the service provider 140 can be integrated within the platform of one or more of the social network providers 150 and/or the content providers 160, which allows the social network providers 150 and the content providers 160 to directly provide support for real-time synchronous communication with persons appearing in image or video files.

Figure 2:
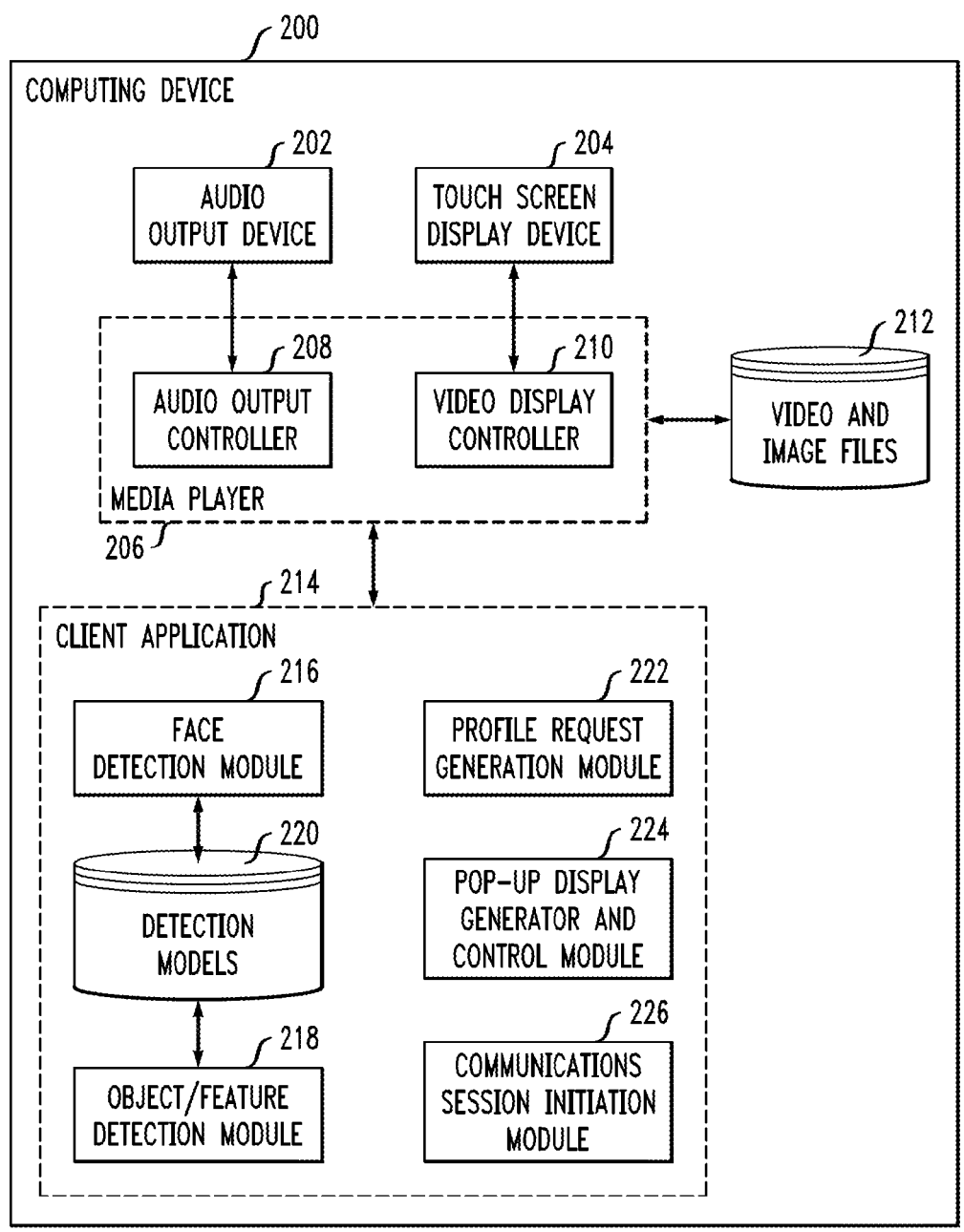
FIG. 2 schematically illustrates a computing device comprising various modules that are used to support provide real-time synchronous communication with persons appearing in image or video files, according to an embodiment of the invention.

FIG. 2 schematically illustrates a computing device comprising various modules that are used to support provide real-time synchronous communication with persons appearing in image or video files, according to an embodiment of the invention. In general, a mobile computing device 200 as shown in FIG. 2 comprises an audio output device 202 (e.g., speaker), a display device 204 (e.g., touch screen), a media player 206 comprising an audio output controller 208 and video display controller 210, and a data store 212 to persistently store video and image files. The computing device 200 further comprises a client application 214 comprising various modules that locally execute on the computing device 200 to support real-time synchronous communication with persons appearing in image or video files.

In particular, as shown in FIG. 2, in one embodiment of the invention, the client application 214 comprises a face detection module 216, an object/feature detection module 218, and detection models 220 that are used to implement detection functions provided by the detection modules 216 and 218, a profile request generation module 222, a pop-up display generator and control module 224, and a communication session initiation module 226.

The audio output controller 208 and video display controller 210 collectively comprise software, hardware, and/or firmware, etc., which is configured to process media files accessed from the data store 212 and generate audio/video/image data that is output via the audio output and display devices 202 an 204. The client application 214 communicates with a server application of a cloud based service provider (e.g., the third party cloud service provider 140 of FIG. 1) so as to provide real-time synchronous communication with persons appearing in image or video files displayed on the computing device 200. In one embodiment, the client application 214 may be an embedded application that is included as part of the computing device 200 as originally manufactured, wherein the user has to option to activate the client application 214 and register with the cloud based service provider. In another embodiment, the client application 214 can be a third-party application that a user downloads to, or otherwise has installed on, the mobile computing device 200 at the option of the user.

The face detection module 216 is configured to detect faces within images or video frames of persons of interest that are selected by a user. The face detection module 216 implements known functions for identifying portions of an image file or video frames that contain faces and generating bounding boxes in the image or video frame that surround portions of the image data associated with individual faces that are detected within the image or video frames. The object/feature detection module 218 is configured to detect and extract other object of features within images or video frames (e.g. residential or commercial buildings, landmarks, etc.) that may be relevant to verify an identity of a person present in a given image or video frame. The detection models 220 comprise trained models and other image templates, for example, which can be used to support the detection functions of the detection modules 216 and 218 using well know techniques, the details of which are not necessary for understanding embodiments of the invention as discussed herein.

The profile request generation module 222 is configured to generate profile requests that are sent to the cloud service provider 140 to request profile information for user-selected persons of interest that are present in displayed images or videos. The profile request generation module 222 is further configured to attach image data, audio data, and/or other types of data to the profile request, wherein such data is associated with the user-selected person (or associated with the image or video in which the person in present). As explained below, such data is utilized by the service provider to verify the identity of a person whose profile information is being requested.

The pop-up display generator and control module 224 is configured to display profile information (received from the service provider) as an overlay on the display screen 204 of the computing device 120 in proximity to the user-selected person present in the displayed image or video. In addition, the pop-up display generator and control module 224 is configured to generate and display one or more control buttons along with the profile information, wherein at least one control button is configured to automatically establish a synchronous communications session with the person using the communications address, in response to user-selection of the displayed control button.

Figure 4:
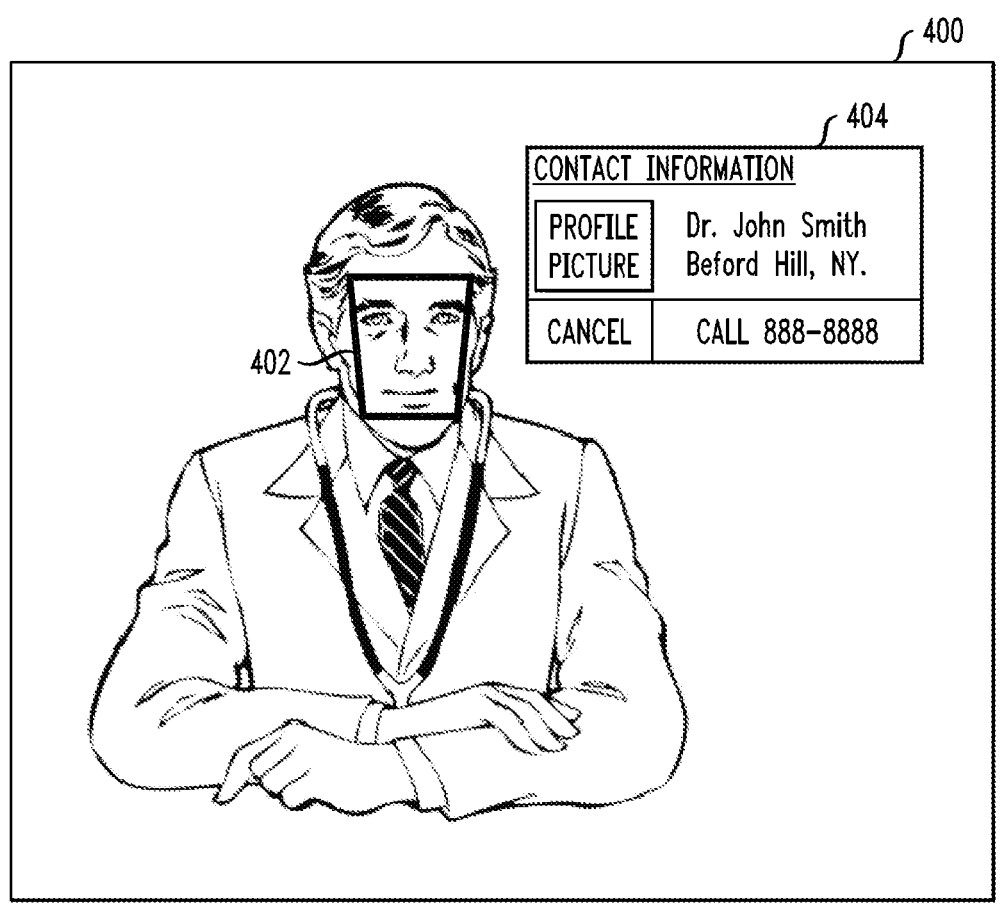
FIG. 4 illustrates a method for associating a person's face in an image with contact information to enable real-time synchronous communication with the person, according to an embodiment of the invention

For example, FIG. 4 illustrates an image 400 showing a user-selected person of interest present in the image 400 with a bounding box 402 surrounding a detected face of the person of interest. The image 400 may be an individual picture or a video frame image extracted from a video file. The image 400 comprises a pop-up item 404 which is overlaid on the image 400 in proximity to the detected face of the person of interest. The pop-up item 404 comprises profile information associated with the person (e.g., name, residence, profile picture, communications address (e.g., telephone), as well as "Cancel" and "Call" control buttons. The "Call" button displays the communications address (e.g., phone number 888-8888) of the person of interest. The "Call" button can be selected by the user to initiate a real-time synchronous communications session (e.g., telephone call) using the associated communications address (e.g., telephone number) that is generated and displayed as part of the pop-up item 404. The "Cancel" button allows the user to opt-out from initiating a communication session with the person of interest, and resume with viewing the video or other images. While the example embodiment of FIG. 4 show a call button to call a telephone number, the pop-up item can provide other types of communications addresses such as a video conference number or a communications service, for example.

Referring back to FIG. 2, the communications session initiation module 226 of the client application 214 is configured to communicate with other local services that operate on the computing device (e.g., telephone, video conference, or other communications service) to initiate, in real-time, a synchronous communications session with the user-selected person of interest who is present in an image or video frame displayed on the screen of the user's computing device. For instance, as noted above, in response to the user selection of a displayed "Call" button, as in the example embodiment of FIG. 4, the communication session initiation module 226 can interact with a call function on a smart phone to automatically initiate a telephone call to the person of interest shown in the displayed image or video.

Figure 3:
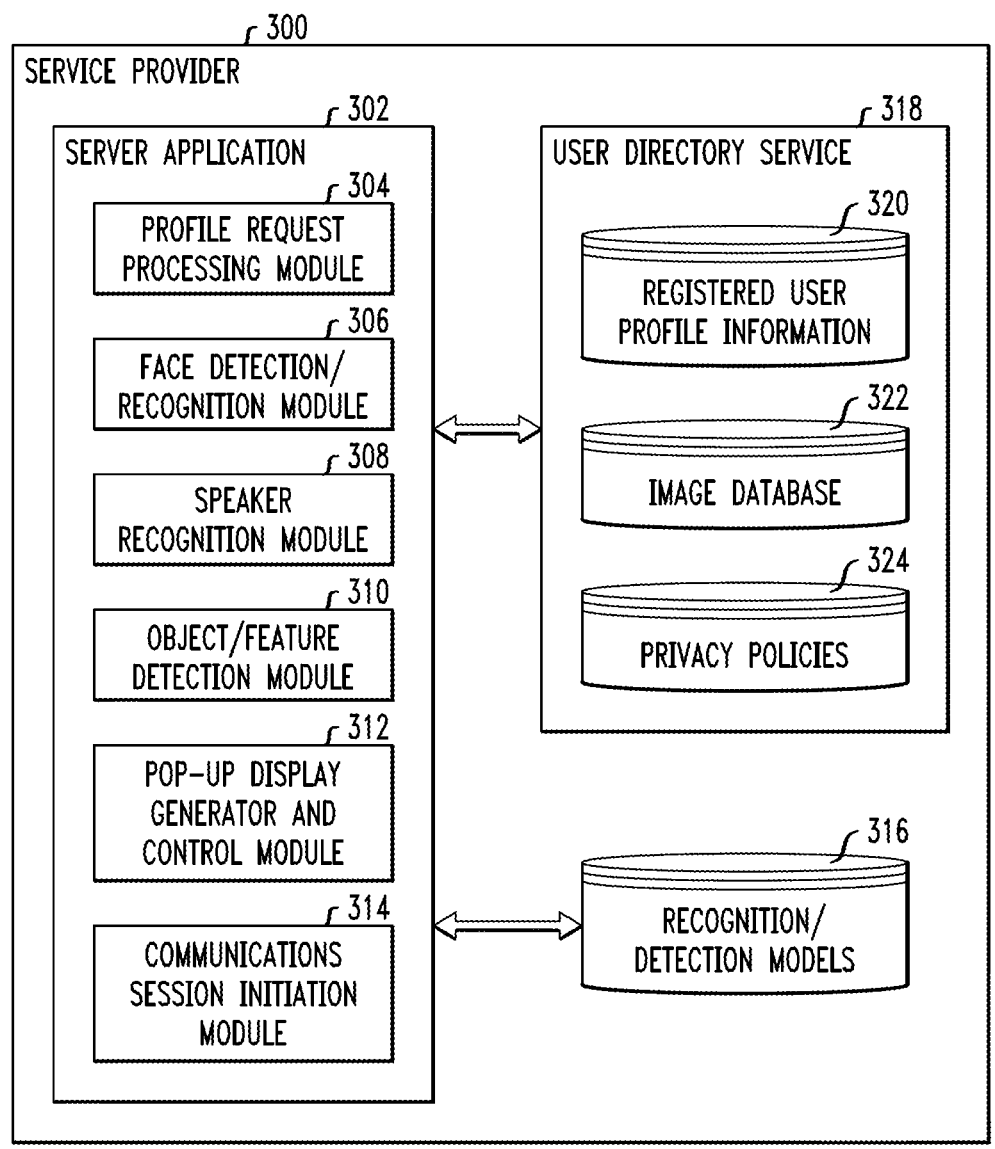
FIG. 3 schematically illustrates a computing system of a service provider that is configured to provide real-time synchronous communication with persons appearing in image or video files according to an embodiment of the invention.

FIG. 3 schematically illustrates a computing system of a service provider that is configured to provide real-time synchronous communication with persons appearing in image or video files according to an embodiment of the invention. In one embodiment of the invention, FIG. 3 illustrates an embodiment the third-party cloud service provider 140 as depicted in FIG. 1. In other embodiments, one or more of the social network service providers 150 and/or the content providers 160 can implement the system 300 of FIG. 3 in the service platform to support real-time synchronous communication with persons appearing in image or video files, as discussed herein.

As shown in FIG. 3, the computing system 300 includes a server application 302 which comprises a profile request processing module 304, a face detection/recognition module 306, a speaker recognition module 308, an object/feature detection module 310, a pop-up display generator and control module 312, and a communication session initiation module 314. The computing system 300 further comprise a local data store 316 of recognition/detection models that are used to support the recognition/detection modules 306/308/310, and a user directory service 318. The user directory service 318 comprises a database of registered user profile information 320, an image database 322, and privacy policies 324. The various components of the computing system 300 may be implemented on one computing node of a network, or distributed among multiple computing nodes of a local area network, for example, of the service provider.

The profile request processing module 304 receives and processes incoming profile requests that are sent from computing devices. The profile request processing module 304 is configured to parse the receive request, and initiate a verification process to verify the identity of one or more persons whose profile information is being requested. For instance, the profile request processing module 304 will send attached image data (included in the request) to the appropriate detection modules 306 and 310, and send attached audio data to speaker recognition module 308. This data is processed in a collective manner to verify the identity of a person whose profile information is being requested using known verification techniques.

The pop-up display generator and control module 312 and communications session initiation module 314 perform the same or similar functions as the modules 224 and 226 of the client application 214 which executes on the computing device 200. The server-side modules 312 and 314 provide support the associated functions server side in embodiments where such functions are not implemented on the client side computing device. Moreover, in one embodiment of the invention, the server application 302 provide support for face detection and recognition in instances where such functions are no implemented on the client side computing device due to, e.g., limited processing capabilities of the computing device.

The user directory service 316 comprises a local or remote service that is accessed by the service provider computing system 300 to access profile information associated with a person whose identity has been verified. The database of registered user profile information 320 comprises various types of information of registered users, including name, residence, communications addresses, etc. The image database 322 comprises a database of profile pictures of registered users, which is used to support face recognition functions. The profile pictures of registered users in the image database 322 are linked to profile information of registered users contained in the registered user profile information database 320.

The privacy policies 324 specify various conditions and rules that are applied when accessing and disseminating profile information of registered users. Indeed, certain registered users may consider the dissemination of their profile information to unknown persons for purposes of implementing the communication services as described herein as a breach of privacy. However, the service provider 300 can manage privacy issues on a service-by-service and/or person-by-person basis using the privacy policies 324. For example, a registered user could opt-out of being identified in videos or images, so that the profile information of the registered user is not automatically displayed in videos or images being viewed by other individuals. When a privacy policy blocks communication, the user attempting to contact a person of interest in an image or video can receive some form of notification in this regard.

Further, false positive identifications can be reduced by showing a reference image or other identifying information in the pop-up item that is displayed to a requesting user. For example, as shown in FIG. 4, the example pop-up item 404 is shown to include a profile picture of the person of interest. This allows the user to compare the profile picture with the displayed image of the person of interest, and allow the user to determine whether he/she should contact the person or not when, for example, the profile picture does not appear to match the person of interest present in the image or video.

In another embodiment, registered users can specify what profile information is actually provided to a requesting user. For example, a business owner might want their business number and not personal number to be provided to requesting users. In addition, a registered user may require multimode verification (e.g., voice and face recognition) before the registered user's profile information is provided. In another embodiment, users could lock out the feature on a phone or a video. In addition, a button could be added to request the contact information for the person seeking profile information of a registered user, if required by the registered user. Furthermore, a registered user could be "invisible" to the service if opting out, wherein the registered user is not able to be recognized and highlighted in a video or image. Alternatively, a registered user can be "visible" but anonymous such that a pop-up item is displayed which simply states "Blocked", for example. In another embodiment, registered users may request payment for their profile information to be used by the service.

Figure 5:
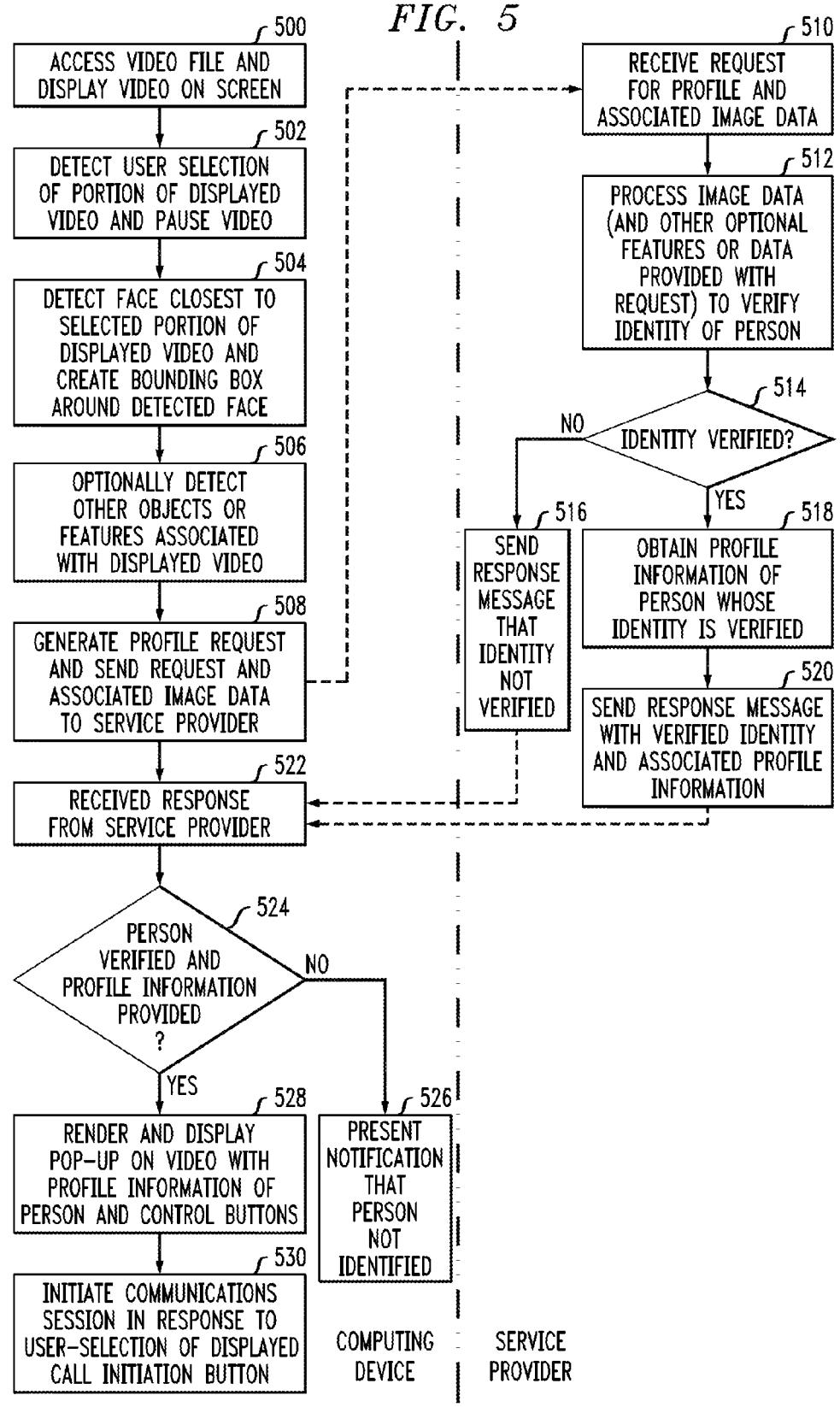
FIG. 5 is a flow diagram of a method to provide real-time synchronous communication with persons appearing in image or video files according to an embodiment of the invention.

FIG. 5 is a flow diagram of a method to provide real-time synchronous communication with persons appearing in image or video files according to an embodiment of the invention. In one embodiment of the invention, FIG. 5 illustrates operating modes of the computing device 200 of FIG. 2, and the service provider computing system 300 of FIG. 3, according to an embodiment of the invention. In this regard, for purposes of illustration, the process steps of FIG. 5 will be discussed with reference to constituent device and system components shown in FIGS. 2 and 3. For example, in one embodiment of the invention, the process steps shown on the left side of the of FIG. 5 comprise functions that are implemented by a client device (e.g., computing device 200 of FIG. 2), while the process steps shown on the right side of FIG. 5 comprise functions that are implemented by a service provider (e.g., service provider computing system 300 of FIG. 3). For simplification of discussion, the method of FIG. 5 will be discussed in the context of video files, although it is to be understood that the same or similar functions apply to image files.

Referring to FIG. 5, a user will access a video file and view the video file displayed on the screen of a computing device (block 500). The video file may be accessed from local storage on the computing device, or may be a streaming video file being streamed from a remote service provider (e.g., social network, video content provider, etc.). While viewing the video on the display screen of the computing device, the user may recognize a person in the video with whom they want to communicate with. In such instance, the user can select the person by, e.g., tapping on the person's body or face as displayed on the screen, circling the person's face as displayed on the screen, or some other type of gesture that is indicative of the user-selection of a person of interest in the displayed video.

The computing device will detect the user selection of the portion of the display video and pause the video (block 502). For example, in one embodiment, the user can tap on the touch screen once to pause the video when a person of interest is displayed. The user can tap on the touch screen once again to continue playing the video. However, if the user is interested in accessing profile information for a person of interest present in the video, while the video is paused, the user can press and hold or double-tap the person's appearance to select that person and acquire profile information for that person of interest. In another embodiment, to select a person of interest, the computing device can be configured to detect a spoken reference to the person of interest displayed on the screen by the user.

In response to the user selection of a person of interest appearing in a video, the computing device will extract (i) a video segment of X milliseconds before the paused video frame (which is being displayed at the time that the user-selection was detected), and (ii) a video segment of Y milliseconds after the paused video frame (where X and Y can be approximately 1000 milliseconds). The video frames provide multiple images (individual video frames) in a temporal context of interest, which can be used to detect a face of the person of interest as selected by the user. The extraction of video segments takes into account that there can be a delay between the time from when the user sees a person of interest in the video and the time when the user actually touches the screen to select the person of interest in the video.

The face detection module 216 of the client application 214 running on the computing device 200 will then proceed to detect a face that is closest to the user selected portion of the displayed video frame and generate a bounding box around the detected face (block 504). In particular, in one embodiment of the invention, the face detection module 216 will process each video frame included in the extracted video segments before and after the paused video frame in the location of each video frame corresponding to the location where the user tapped the display screen, to identify a face of the person of interest and generate a bounding box around the face. In this regard, the face detection module 216 can generate multiple separate images of the person of interest with a bounding box around the detected face of the person in each of the extracted video frames. The multiple separate images can be collectively processed using facial recognition to verify the identity of the person of interest.

In another embodiment of the invention, in addition to face detection, the object feature detection module 218 can be called to detect other objects or features associated with video frames, which can be further used to verify the identity of the person of interest selected by the user (block 506). For example, a real estate agent might be near a house for sale which appears in the video/image, or an owner of a restaurant may be near the restaurant which appears in the video-image. In these examples, object recognition of the home being sold by the real estate agent, or the restaurant of the restaurant owner (or other related objects) can be utilized, in addition to face detection/recognition, to augment and enhance the verification process for verifying the identity of the real estate person or the restaurant owner. In addition, an audio clip of the person's voice may be extracted from an audio file associated with the video file (e.g., a segment of an audio clip can be extracted from the video file, which corresponds to the time segment of the video frames that are extracted and used for face detection/recognition of the user selected person of interest). The profile request generation module 222 will then proceed to generate a profile request and send the request and associated image data (and other optional feature data, audio data, etc.) to the service provider (block 508). It is to be understood that in other embodiment, the face detection and/or object/feature detection steps can be implemented server side in circumstances where the client computing device does not or cannot implement such functions (e.g., limited processing resources).

The service provider will receive the profile request and associated image data (block 510). As noted above, the profile request processing module 304 of the server application 302 of the service provider 300 will proceed to parse the received request, and initiate a verification process to verify the identity of the person whose profile information is being requested (block 512). For instance, the profile request processing module 304 will send attached image data (included in the request) to the appropriate detection modules 306 and 310, and send the attached audio data to speaker recognition module 308. In one embodiment, the verification process comprises performing a face recognition process using the image data to identify the person. For example, in one embodiment of the invention, as noted above, the service provider 140 implement a face recognition system based on convolutional neutral networks to identify the person from a large online database a profile pictures of registered users. In another embodiment, audio data of the person speaking can be processed by the speaker recognition module to identify the speaker. The detection results generated by the various modules are analyzed in a collective manner to verify the identity of a person whose profile information is being requested.

If the identity of the person cannot be verified (negative determination in block 514), a response message is generated and sent to the computing device to notify the user that the identity of the person of interest could not be verified (block 516). On the other hand, if the identity of the person is verified (affirmative determination in block 514), the profile request processing module 304 will proceed to access a user directory service to obtain profile information of the person whose identity was verified (block 518). If profile information is found for the person of interest whose identity was verified, the service provider will proceed to determine if there are any privacy policies associated with the person of interest, which would prevent, limit, otherwise specify the manner in which profile information of the person of interest can be disseminated.

The service provider will then proceed to generate a response message which comprises the verified identity and the associated profile information of the person of interest, and then transmit the response message to the computing device (block 520). The profile information content of the response message and/or the manner in which (or the conditions under which) the response message is transmitted to the computing device may depend on the associated privacy policies, if any, as specified by the person of interest whose identity was verified.

On the client side, the client application 214 will receive the response message from the service provider (block 522). If the response message indicates that the identity of the person of interest could not be verified, or that no profile information could be found (negative determination in block 524), then the pop-up generator and control module 312 can generate and display an appropriate notification that the person was not identified or that no profile information could be found (block 526). On the other hand, if the response message indicates that the identity of the person of interest was verified, and that the person's profile information was found (affirmative determination in block 524), the pop-up generator and control module 312 will generate and display a pop-up item (e.g., item 404, FIG. 4) on the display screen of the computing device in proximity to the user-selected person of interest present in the paused video, wherein the pop-up item includes the profile information of the person of interest and one or more control buttons (block 528). The control buttons can be selected by the user to automatically initiate a synchronous communications session with the person of interest using the communications address (block 530).

In another embodiment of the invention, the techniques discussed herein can utilized to establish conference calls with multiple persons of interest. For example, assume that a user is viewing an image or video on his/her smart phone (or some other computing device with a phone number or internet address), and the person sees multiple persons of interest with whom the user wants to establish a conference call. The user can tap a control button (e.g., select button) displayed on upper corner of the display screen (or perform some other type of gesture) which indicates that a group of persons will be selected. The user can proceed to select (e.g., tapping screen) various persons of interest present in the image or paused video frame, one after the other. As the user selects the persons of interest, feedback can be generated to the user in the form of bounding boxes being generated around the faces of the selected persons, along with feedback to indicate whether or not the identity of the selected persons of interest have been verified, etc.

When the user is finished selecting each person of interest, and at least two or more of the selected persons of interest have been identified, the user can perform another gesture, e.g., tap and hold the last selected person, to have call button displayed. In one embodiment, the call button that is displayed can say, e.g., Call Three People" whose identity was verified. Optionally, a button can be displayed which is selectable by the user to navigate through a list of names and associated communications addresses (e.g., phone numbers) of the user-selected persons of interest whose identities were verified. The user can select the displayed call button, and the computing device proceeds to establish a multi-party call or videoconference or multi-party internet conference (e.g., Skype) etc., using the list of names and associated communications addresses.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 6, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 6:
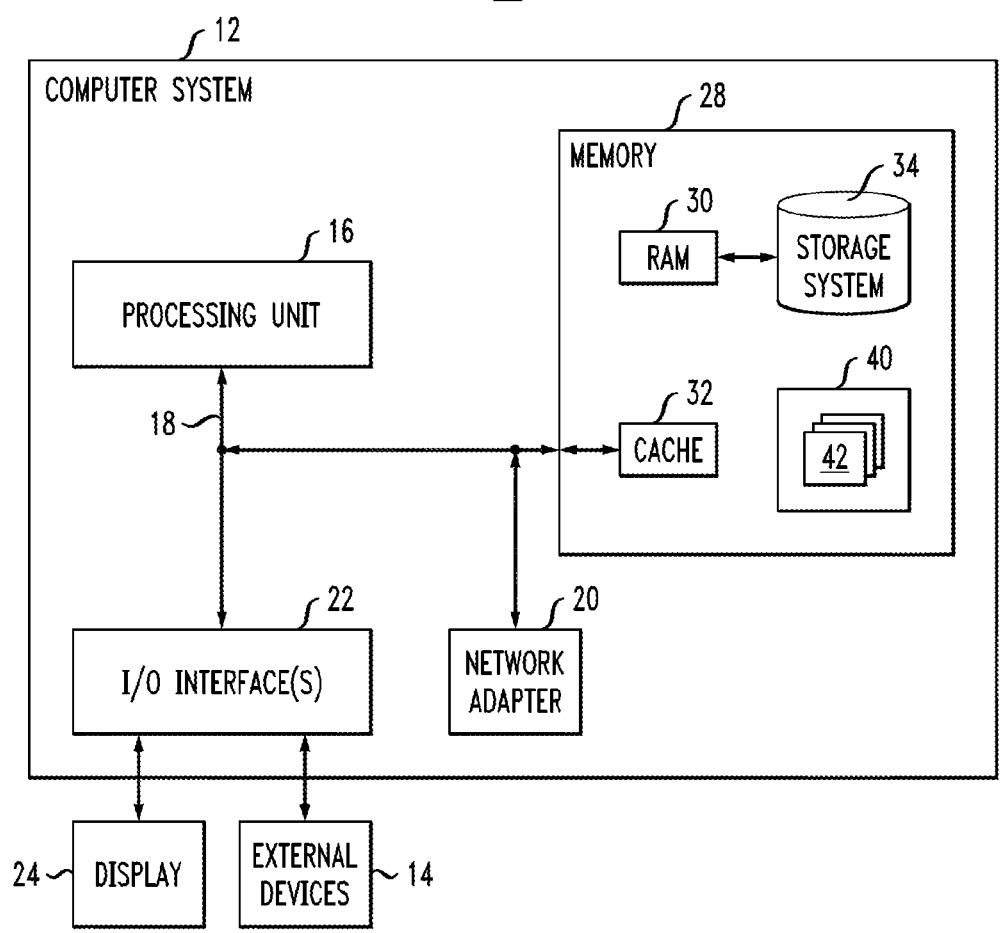
FIG. 6 illustrates a computing system that may be used to implement one or more components/steps of the techniques of the invention, according to an embodiment of the invention.

In FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is be understood that embodiments of the invention can be implemented as a cloud service on one or more cloud computing platforms, while in other embodiments of the invention, implementation of the systems and methods recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
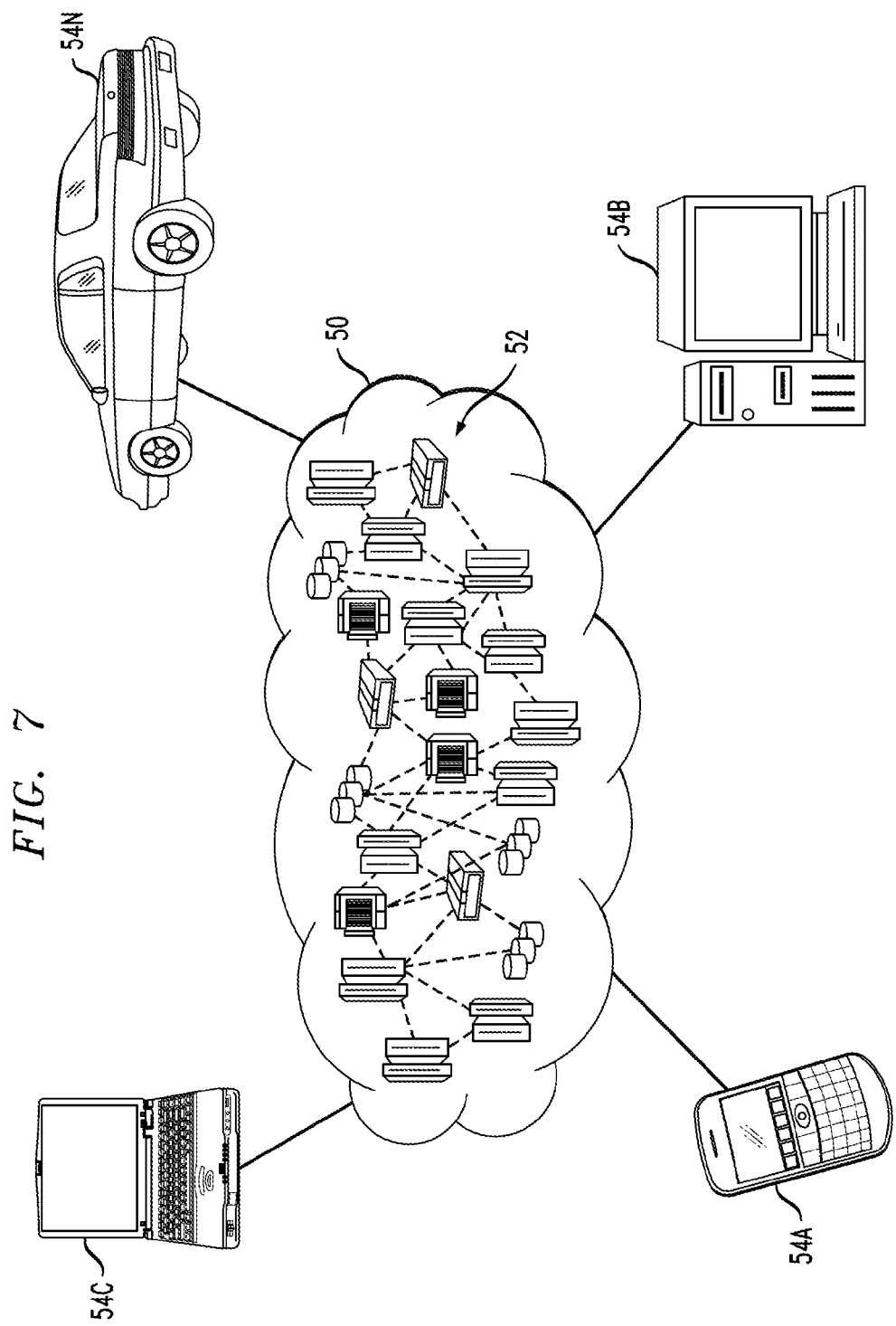
FIG. 7 depicts a cloud computing environment according to an embodiment of the invention.

Referring now to FIG. 7, an illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide functions as described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various functions implemented by the service provider 300 in FIG. 3, for example, to provide support for enabling real-time synchronous communication with persons appearing in image or video files, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by a computing device, comprising:
    displaying an image or video on a display screen of the computing device;
    detecting a user selection of a person present in the displayed image or video;
    sending a request to a service provider for contact information associated with the user-selected person whose contact information is unknown to the user, wherein the request comprises image data of a face of the user-selected person displayed on the screen, and audio data of a voice of the person;
    receiving from the service provider contact information associated with the user-selected person whose identify is verified by the service provider by (i) performing a face recognition process to compare the image data against a database of profile images to identify the user-selected person and by (ii) performing a speaker recognition process using the audio data to identify the person, wherein the contact information comprises a communications address of the user-selected person;
    receiving from the service provider at least one profile image from the database of profile images, which was used to verify the identity of the person;
    displaying the received contact information and the at least one profile image within a pop-up item that is overlaid on the displayed image or video on the computing device of the user to enable the user to compare the profile image with the displayed image or video of the user-selected person whose contact information is being requested by the user; and
    utilizing the displayed contact information to initiate a communications session on the computing device with the user-selected person present in the displayed image or video.

2. The method of claim 1, further comprising displaying the contact information on the display screen of the computing device along with a control button, wherein the control button is configured to automatically initiate the communications session with the user-selected person using the communications address, in response to user-selection of the displayed control button.

3. The method of claim 1, wherein the communications address comprises at least one of a telephone number, a video conference number, and a communications service.

4. The method of claim 1, wherein detecting a user selection of a person present in the displayed image or video comprises:
    detecting a user-selected region of the displayed image or video;
    detecting a face in proximity to a user selected region of the displayed image or video; and
    generating a bounding box around a detected face in the display image or video.

5. The method of claim 4, wherein sending a request to a service provider for contact information associated with the user-selected person comprises sending image data of the detected face within the bounding box.

6. The method of claim 1, wherein sending a request to a service provider for contact information associated with the user-selected person comprises:

extracting least a portion of image data of the displayed image or video which includes a face of the user-selected person; and sending the extracted image data to the service provider for use in the face recognition process to verify an identity of the user-selected person.

7. The method of claim 1, wherein sending a request to a service provider for contact information associated with the user-selected person comprises:

extracting a least a portion of an audio file associated with the displayed video, which includes an audio clip of a voice of the user-selected person; and wherein said audio data of the voice of the person which is sent to the server provider comprises the audio clip.

8. The method of claim 1, wherein detecting a user selection of a person present in the displayed image or video comprises detecting a user selection of one or more persons present in the displayed image or video, and wherein initiating a communications session on the computing device comprises initiating one of (i) a communications session with the one user-selected person using the communications address associated with the one user-selected person and (ii) a multi-party communications session with two or more of the user-selected persons using the communications addresses associated with the two or more user-selected persons.

9. An article of manufacture comprising a computer readable storage medium having program code embodied therewith, wherein the program code is executable by a computing device to cause the computing device to perform a method comprising:

displaying an image or video on a display screen of the computing device;

detecting a user selection of a person present in the displayed image or video;

sending a request to a service provider for contact information associated with the user-selected person whose contact information is unknown to the user, wherein the request comprises image data of a face of the user-selected person displayed on the screen, and audio data of a voice of the person;

receiving from the service provider contact information associated with the user-selected person whose identify is verified by the service provider by (i) performing a face recognition process to compare the image data against a database of profile images to identify the user-selected person and by (ii) performing a speaker recognition process using the audio data to identify the person, wherein the contact information comprises a communications address of the user-selected person;

receiving from the service provider at least one profile image from the database of profile images, which was used to verify the identity of the person;

displaying the received contact information and the at least one profile image within a pop-up item that is overlaid on the displayed image or video on the computing device of the user to enable the user to compare the profile image with the displayed image or video of the user-selected person whose contact information is being requested by the user; and utilizing the displayed contact information to initiate a communications session on the computing device with the user-selected person present in the displayed image or video.

10. The article of manufacture of claim 9, further comprising displaying the contact information on the display screen of the computing device along with a control button, wherein the control button is configured to automatically initiate the communications session with the user-selected person using the communications address, in response to user-selection of the displayed control button.

11. The article of manufacture of claim 9, wherein the communications address comprises at least one of a telephone number, a video conference number, and a communications service.

12. The article of manufacture of claim 9, wherein detecting a user selection of a person present in the displayed image or video comprises:

detecting a user-selected region of the displayed image or video;

detecting a face in proximity to a user selected region of the displayed image or video; and generating a bounding box around a detected face in the display image or video.

13. The article of manufacture of claim 12, wherein sending a request to a service provider for contact information associated with the user-selected person comprises sending image data of the detected face within the bounding box.

14. The article of manufacture of claim 9, wherein sending a request to a service provider for contact information associated with the user-selected person comprises:

extracting least a portion of image data of the displayed image or video which includes a face of the user-selected person; and sending the extracted image data to the service provider for use in the face recognition process to verify an identity of the user-selected person.

15. The article of manufacture of claim 9, wherein sending a request to a service provider for contact information associated with the user-selected person comprises:

extracting a least a portion of an audio file associated with the displayed video, which includes an audio clip of a voice of the user-selected person; and wherein said audio data of the voice of the person which is sent to the server provider comprises the audio clip.

16. The article of manufacture of claim 9, wherein detecting a user selection of a person present in the displayed image or video comprises detecting a user selection of one or more persons present in the displayed image or video, and wherein initiating a communications session on the computing device comprises initiating one of (i) a communications session with the one user-selected person using the communications address associated with the one user-selected person and (ii) a multi-party communications session with two or more of the user-selected persons using the communications addresses associated with the two or more user-selected persons.

17. A mobile computing device, comprising:

a memory device configured to store program code; and a computer processor system configured to execute the program code stored in the memory device to implement a method comprising:

displaying an image or video on a display screen of the computing device;

detecting a user selection of a person present in the displayed image or video;

sending a request to a service provider for contact information associated with the user-selected person whose contact information is unknown to the user, wherein the request comprises image data of a face of the user-selected person displayed on the screen, and audio data of a voice of the person;

receiving from the service provider contact information associated with the user-selected person whose identify is verified by the service provider by (i) performing a face recognition process to compare the image data against a database of profile images to identify the user-selected person and by (ii) performing a speaker recognition process using the audio data to identify the person, wherein the contact information comprises a communications address of the user-selected person;

receiving from the service provider at least one profile image from the database of profile images, which was used to verify the identity of the person;

displaying the received contact information and the at least one profile image within a pop-up item that is overlaid on the displayed image or video on the computing device of the user to enable the user to compare the profile image with the displayed image or video of the user-selected person whose contact information is being requested by the user; and utilizing the displayed contact information to initiate a communications session on the computing device with the user-selected person present in the displayed image or video.

18. The computing device of claim 17, further comprising displaying the contact information on the display screen of the computing device along with a control button, wherein the control button is configured to automatically initiate the communications session with the user-selected person using the communications address, in response to user-selection of the displayed control button.

19. The computing device of claim 17, wherein the communications address comprises at least one of a telephone number, a video conference number, and a communications service.

20. The computing device of claim 17, wherein detecting a user selection of a person present in the displayed image or video comprises:

detecting a user-selected region of the displayed image or video;

detecting a face in proximity to a user selected region of the displayed image or video; and generating a bounding box around a detected face in the display image or video.

* * * * *